United States Patent [19]
Kitamura

[11] Patent Number: 5,501,592
[45] Date of Patent: Mar. 26, 1996

[54] MOLD HAVING OPPOSED OFFSET COOLING CHANNELS

[75] Inventor: Takehiko Kitamura, Chiba, Japan

[73] Assignee: Sumitomo Heavy Industries, Ltd., Tokyo, Japan

[21] Appl. No.: 281,658

[22] Filed: Jul. 28, 1994

[30] Foreign Application Priority Data

Dec. 22, 1993 [JP] Japan .................................. 5-345638

[51] Int. Cl.$^6$ .................................................. B29C 45/73
[52] U.S. Cl. .................... 425/547; 264/107; 264/328.16; 425/552; 425/810
[58] Field of Search ..................................... 425/547, 548, 425/552, 810; 264/106, 107, 328.14, 328.16

[56] References Cited

U.S. PATENT DOCUMENTS

| | | | |
|---|---|---|---|
| 1,582,704 | 4/1926 | Sylvester et al. . | |
| 4,185,955 | 1/1980 | Holmes et al. | 425/810 |
| 4,462,780 | 7/1984 | Stavitsky et al. | 425/547 |

FOREIGN PATENT DOCUMENTS

| | | |
|---|---|---|
| 57-187211 | 11/1982 | Japan . |
| 61-56012 | 4/1986 | Japan . |
| 3-19049 | 3/1991 | Japan . |

OTHER PUBLICATIONS

Patent Abstracts of Japan, vol. 11, No. 336, JP-A-62 117 716.
Patent Abstracts of Japan, vol. 13, No. 528, JP-A-01 216 807.
Patent Abstracts of Japan, vol. 16, No. 218, JP-A-04 040 643.

*Primary Examiner*—Tim Heitbrink
*Attorney, Agent, or Firm*—Nikaido Marmelstein Murray & Oram

[57] ABSTRACT

In an injection mold having a cavity formed between opposing faces of a fixed mold and a movable mold for defining a shape of a product, and cooling channels formed in the fixed mold and the movable mold, respectively, for cooling resins injected into the cavity, cooling channels of the movable mold are formed at positions at least opposite to those where cooling channels of the fixed mold are not formed, thereby obtaining an injection mold capable of securing uniformity of optical properties of the obtained molded article, such as birefringence and causing no deterioration of mechanical properties of the molded article such as a deflection even when a cooling time is shortened in order to increase cycle of the injection molding.

3 Claims, 6 Drawing Sheets

5,501,592

MOLD HAVING OPPOSED OFFSET COOLING CHANNELS

BACKGROUND OF THE INVENTION

1. Field of the Invention

The present invention relates generally to an injection mold, and more particularly, to an injection mold suitably used for molding a flat plate-shaped product having a large project area such as a substrate for an optical disc.

2. Description of the Related Art

As is generally known, in an injection molding of various resins, it is necessary to cool and solidify resins, which are melted in a heating cylinder and injected into a cavity, in the cavity and to take out the resins from the cavity. For this purpose, cooling channels for cooling and solidifying the resins in the cavity are conventionally formed in a fixed mold and a movable mold, respectively.

FIGS. 4 and 5 show the molds among the conventional injection molds for molding a compact disc (a substrate for an optical disc).

FIG. 4 shows an arrangement of cooling channels 3 viewed from a mirror surface 2 defining a cavity of a fixed mold 1, and FIG. 5 shows an arrangement of cooling channels 6 viewed from a mirror surface 5 of a movable mold 4.

In these figures, the cooling channels 3 and 6 are formed of a plurality of cooling channels (three cooling channels in these figures) 7, 8, and 9 extending to circumferential directions and the cooling channels radially communicating these cooling channels 7, 8, and 9. The cooling channels 7, 8, and 9 extending to circumferential directions are formed at equal intervals in the radial directions from the respective centers. Accordingly, when the movable mold 4 is superimposed on the fixed mold 1, these cooling channels 7, 8, and 9 formed in both fixed and movable molds 1 and 4 are arranged so that they completely correspond to each other in the radial directions of the cavity.

In the conventional injection mold as described above, the cooling channels 7, 8, and 9 of the movable mold 4 and the fixed mold 1 are arranged so that they completely correspond to each other in a radial directions of the cavity. Thus, when a compact disc is molded by these fixed and movable molds 1 and 4, a cooling rate at the positions where the cooling channels 7, 8, and 9 are not formed is inferior to that at the positions where the cooling channels 7, 8, and 9 are formed.

Thus, the conventional injection mold has the following problems.

When a cooling time is shortened at a request of increasing a cycle of injection molding, optical properties such as birefringence of the obtained optical disc becomes uneven due to a difference of the cooling rate of the resins in the cavity 2 between the sites where the cooling channels 7, 8, and 9 are formed and those where these cooling channels are not formed, or mechanical properties of the obtained optical disc is deteriorated due to occurrence of a warpage or the like.

The problems as described above will be specifically described. Firstly, using the conventional injection mold, an injection molding was carried out to obtain a compact disc having a diameter of 120 mm under the conditions of mold temperature of 80° C., resin temperature of 320° C. and a cooling time of 2.5 seconds. In each of the circumferential directions of seven radial directions of the obtained disc, birefringence at fifty points was measured, respectively. The average values per each of the radiuses were found from the measured values, and the average values were subtracted from each of the measured values. FIG. 6 is a circle graph showing the remainders obtained by subtracing the average values from each of the measured values. In this figure, the speckled portions show unevenness of the birefringence. The larger area of the speckled portion means the larger unevenness of the birefringence. Accordingly, as apparently from the figure, in the disc molded the conventional injection mold has a large unevenness of the birefringence in the faces thereof, thereby causing remarkably unevenness of the optical properties of the disc.

SUMMARY OF THE INVENTION

Accordingly, in order to overcome the problems as described above, it is an object of the present invention to provide an injection mold capable of securing uniformity of optical properties of a molded article, such as birefringence and causing no deterioration of mechanical properties of a molded article such as a deflection even when a cooling time is shortened in order to increase cycle of the injection molding.

In order to achieve the object as described above, according to an aspect of the present invention, there is provided an injection mold having a cavity formed between opposing faces of a fixed mold and a movable mold for defining a shape of a product wherein cooling channels of the movable mold are formed in the movable mold at positions at least opposite to those where cooling channels of the fixed mold are not formed.

According to another aspect of the present invention for molding a circular-shaped product, there is provided an injection mold wherein a circular-shaped cavity is formed and the cooling channels of the fixed mold and the movable mold are formed of a plurality of cooling channels extending to circumferential directions, respectively, and the cooling channels extending to circumferential directions of the movable mold are arranged at positions at least opposite to those between cooling channels extending circumferential directions of the fixed mold in the radial direction of the cavity.

According to a further aspect of the present invention, there is provided an injection mold especially applied to the injection mold for molding a substrate for an optical disc.

According to an injection mold of the present invention as described above, the resins filled into almost all parts of the cavity may be uniformly cooled by covering the sites in one of the fixed mold and the movable mold where cooling channels are not formed with the cooling channels formed in the other mold.

Therefore, an injection mold according to the present invention is suitably used for molding a flat plate-shaped substrate for an optical disc having a large project area.

The objects, configurations and advantages of the present invention will be apparent from the following description of the preferred embodiments of the invention in conjunction with the accompanying drawings.

DESCRIPTION OF THE PREFERRED EMBODIMENTS

Figure 1:
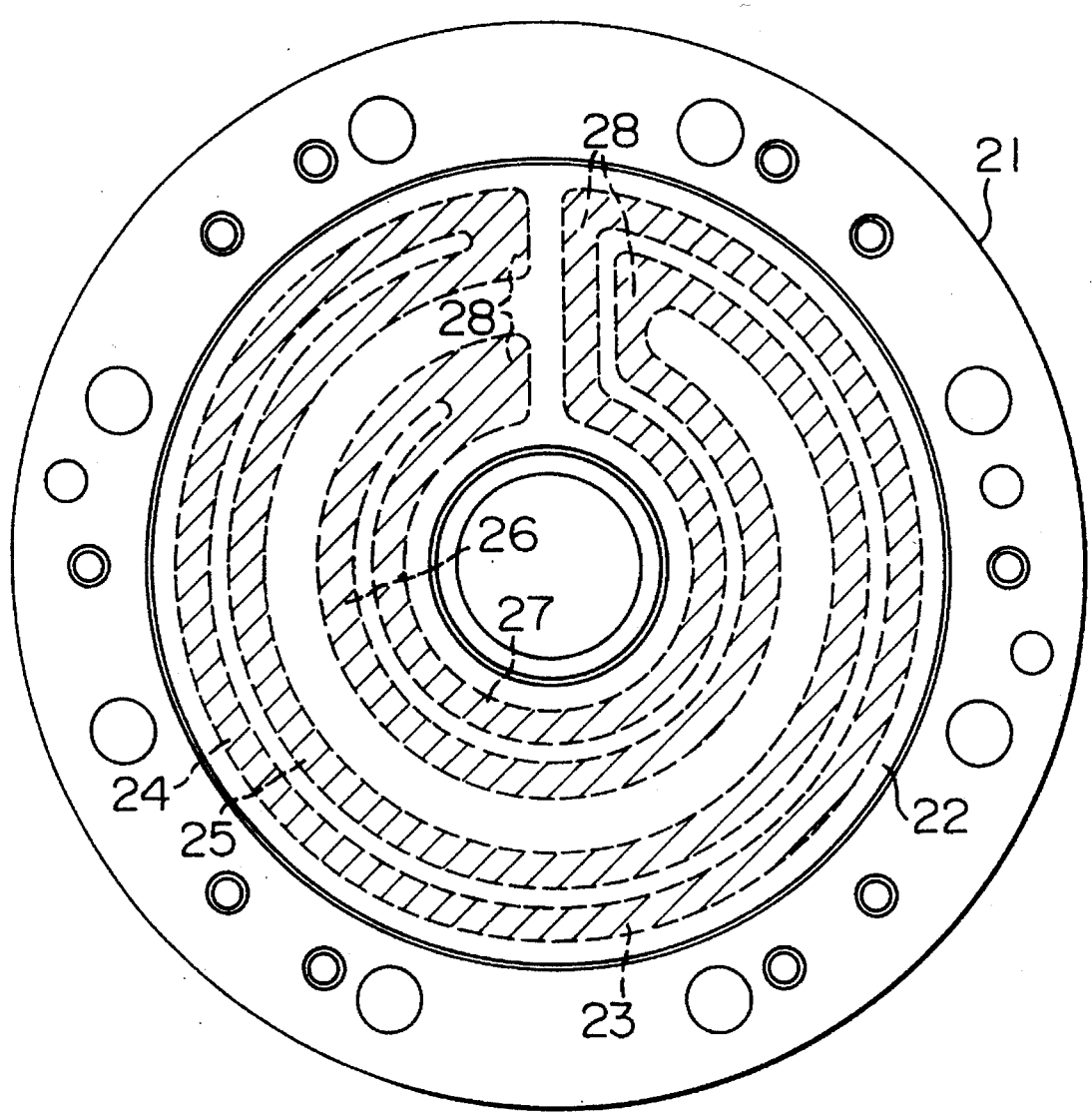
FIG. 1 is an arrangement diagram of cooling channels viewed from a mirror surface side of a movable mold showing one embodiment of the injection mold according to the present invention.

An embodiment of the present invention will be described with reference to the accompanying drawings. Since a configuration of a fixed mold in this embodiment is same as that shown in FIG. 4, the same reference numerals are used and explanation thereof will be omitted.

Figure 4:
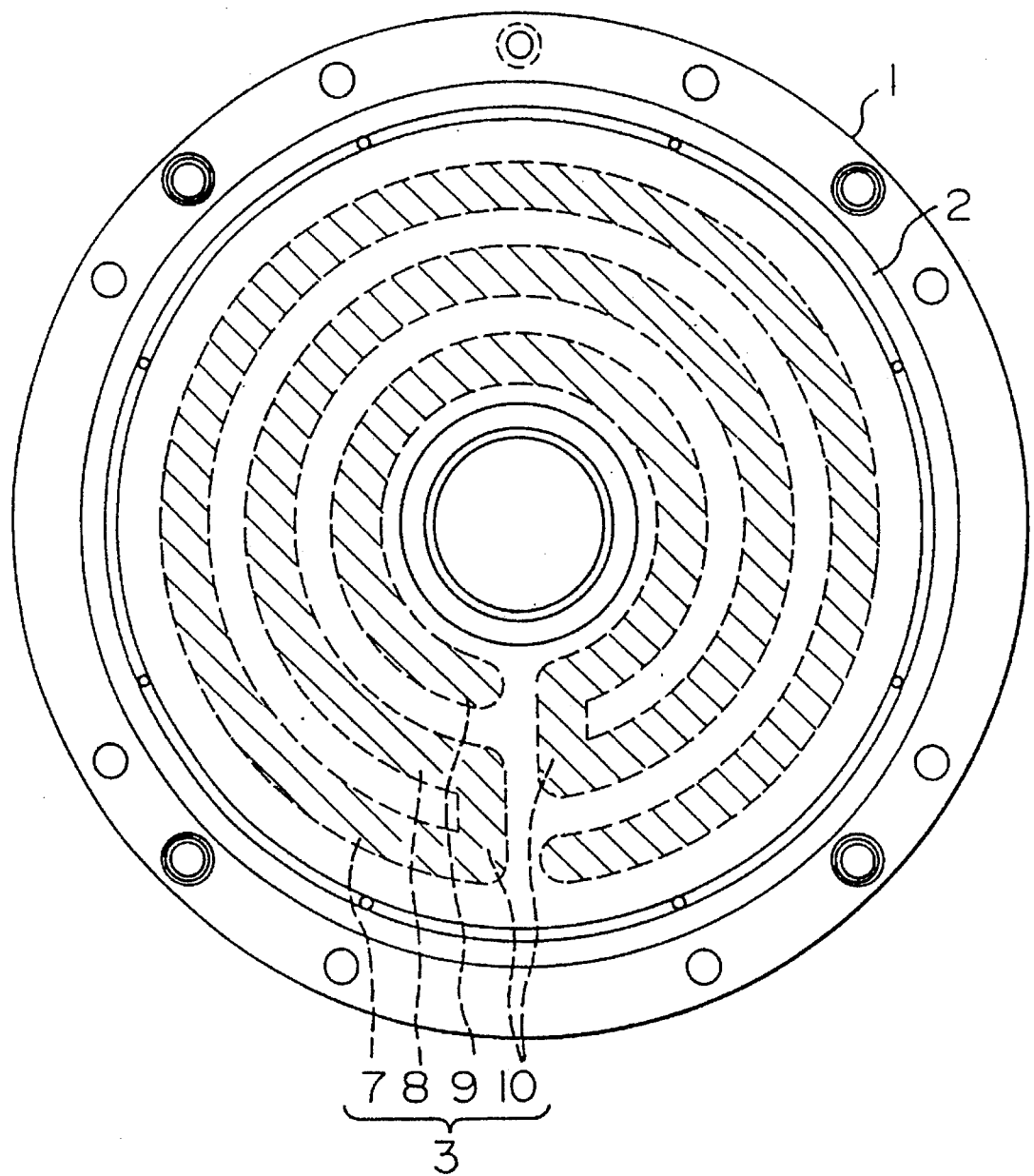
FIG. 4 is an arrangement diagram of cooling channels viewed from a mirror surface side of a fixed mold showing one embodiment of the injection mold according to the conventional example and to the embodiment of the present invention.
Figure 5:
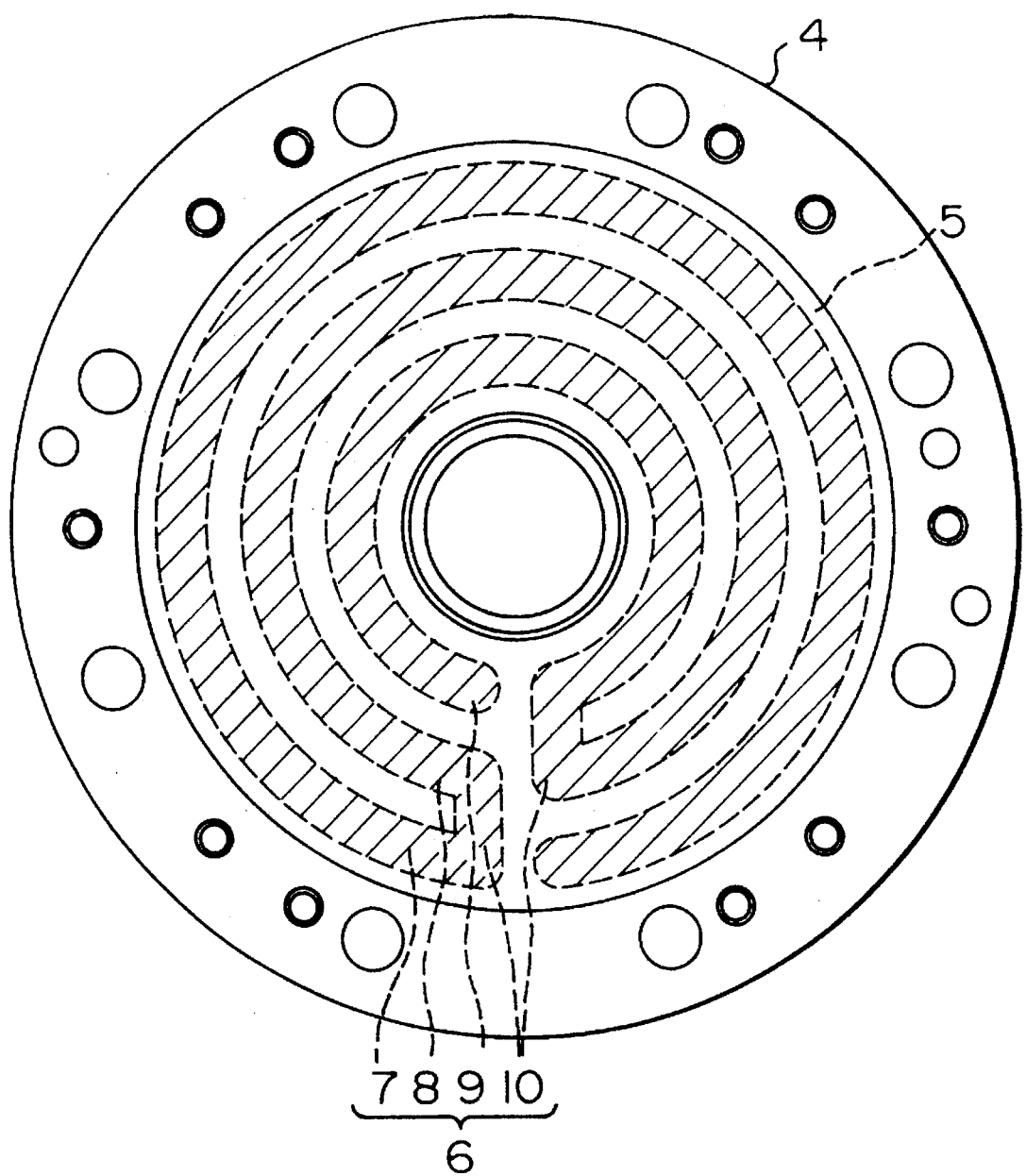
FIG. 5 is an arrangement diagram of cooling channels viewed from a mirror surface side of a movable mold of the conventional injection mold.

FIG. 1 shows a movable mold 21 arranged in the opposite position of the fixed mold 1 shown in FIG. 4.

In the movable mold 21, a cooling channel 23 viewed from its mirror surface 22 is formed. The cooling channel 23 consists of four cooling channels 24, 25, 26, and 27 extending to circumferential directions and cooling channels 28 radially communicating these four circumferential cooling channels. These circumferential cooling channels 24 to 27 are formed at circumferential positions at least opposite to those where the cooling channels 7 to 9 extending to circumferential directions of the fixed mold 1 as described above are not formed.

That is, the cooling channel 25 is arranged at a position opposite to that between the cooling channels 7 and 8 of the fixed mold 1; the cooling channel 26 is arranged at a position opposite to that between the cooling channels 8 and 9 of the fixed mold 1, respectively. Further, the cooling channel 24 is arranged so as to pass between the end portion of the cooling channel 7 and the cooling channel 10 of the fixed mold 1; and the cooling channel 27 is arranged so as to pass a position opposite to that between the end portion of the cooling channel 9 and the cooling channel 10 of the fixed mold 1, respectively. The cooling channels 28 communicating these cooling channels 24 to 27 are arranged at positions diametrically opposite to those of cooling channels 10 of the fixed mold against the center of the cavity.

Figure 2:
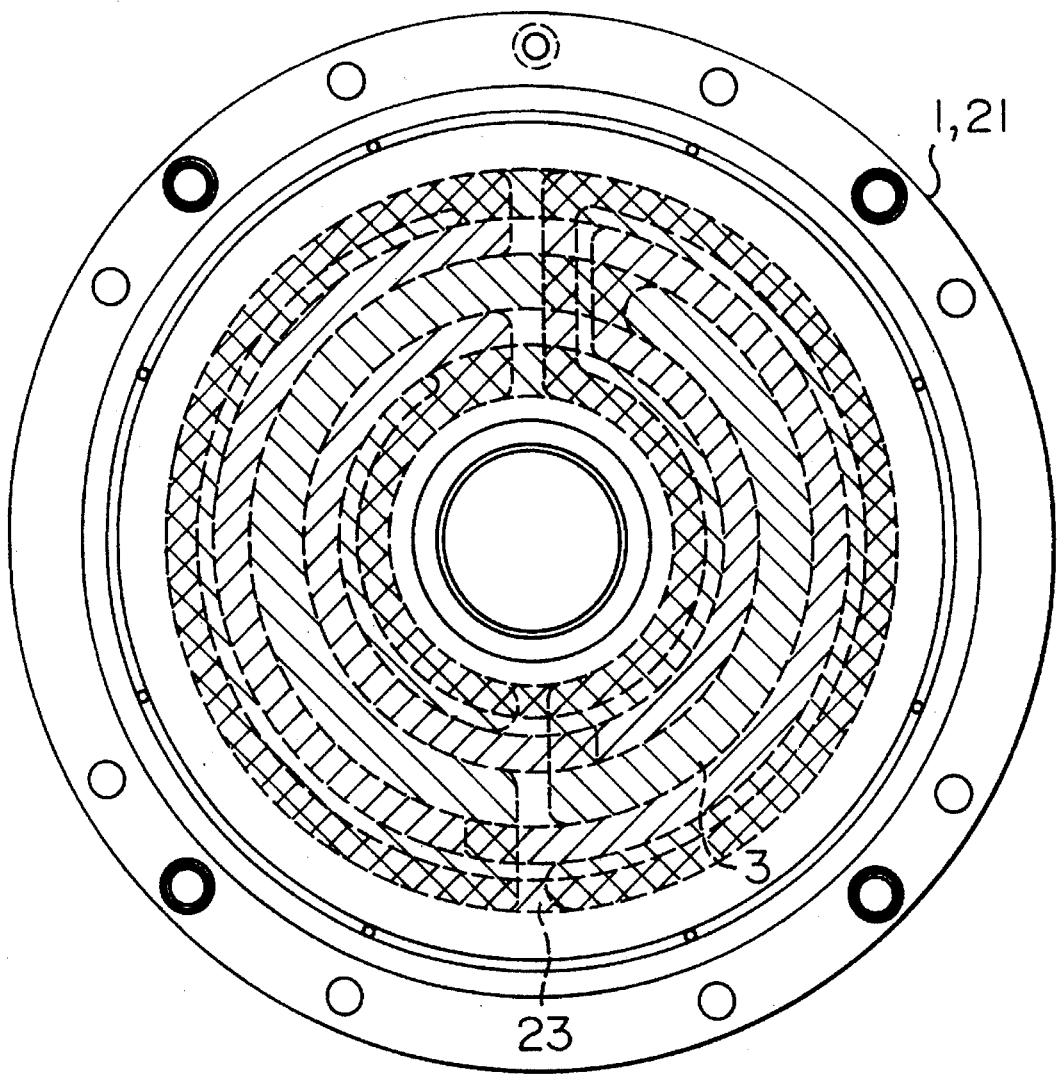
FIG. 2 is an arrangement diagram of cooling channels in a state of superimposing the fixed mold and the movable mold in the embodiment of the injection mold according to the present invention.

Accordingly, as shown in FIG. 2, when the movable mold 21 is superimposed on the fixed mold 1, almost all parts of the resins filled into the cavity are cooled by these cooling channels 24 to 27 and 28, and the cooling channels 7 to 9 and 10.

Therefore, according to the injection mold having configuration as described above, the difference of the cooling rate of the resin due to the position of the resins in the cavity is not caused because almost all parts of the resins in the cavity are cooled upon molding by the cooling channels 24 to 27 and 28 of the movable mold and the cooling channels 7 to 9 and 10 of the fixed mold 1, as shown in FIG. 2. Accordingly, even when the cooling time is shortened in order to increase a cycle of the injection molding, uniformity of the optical properties of a molded article, such as birefringence may be secured, and a molded article which does not cause deterioration of mechanical properties, such as a deflection may be obtained.

Experimental Example

Figure 3:
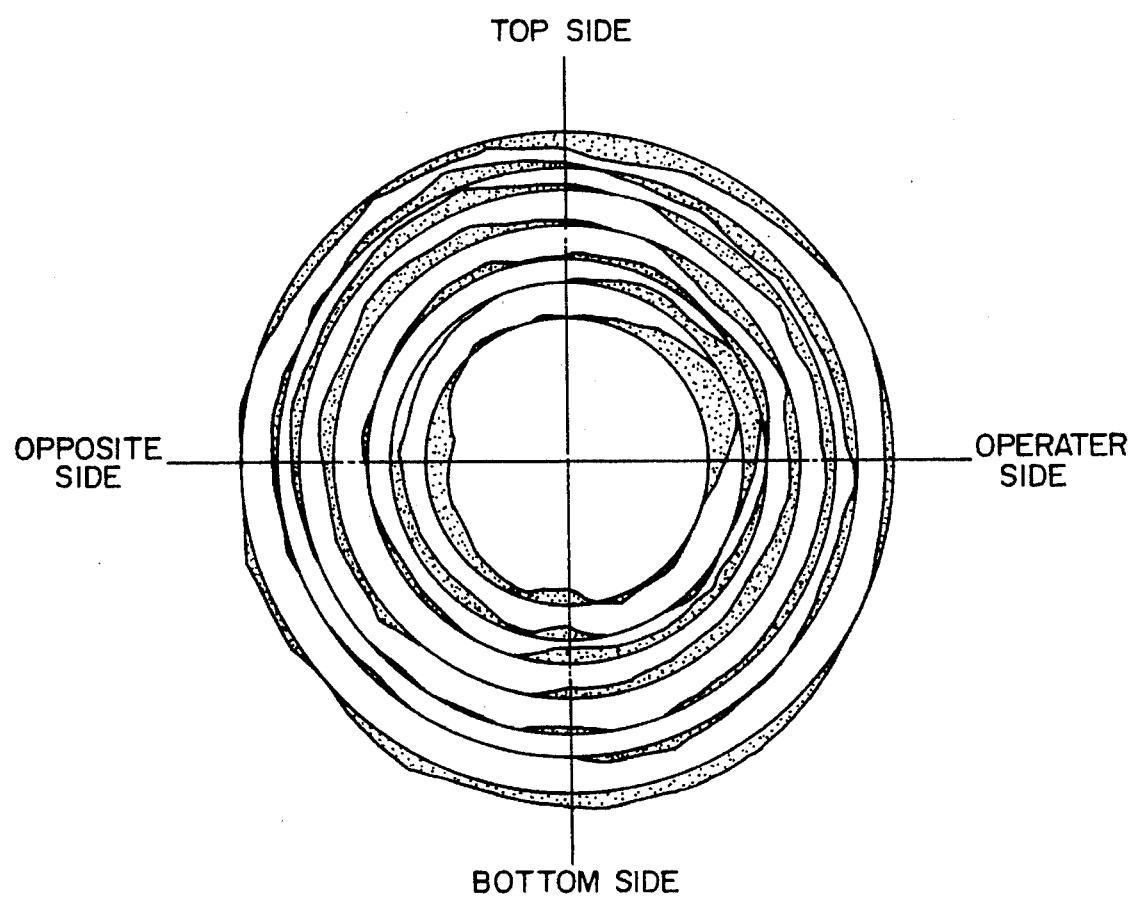
FIG. 3 is a circular graph showing unevenness of birefringence in a compact disc molded by an injection mold of the embodiment according to the present invention.
Figure 6:
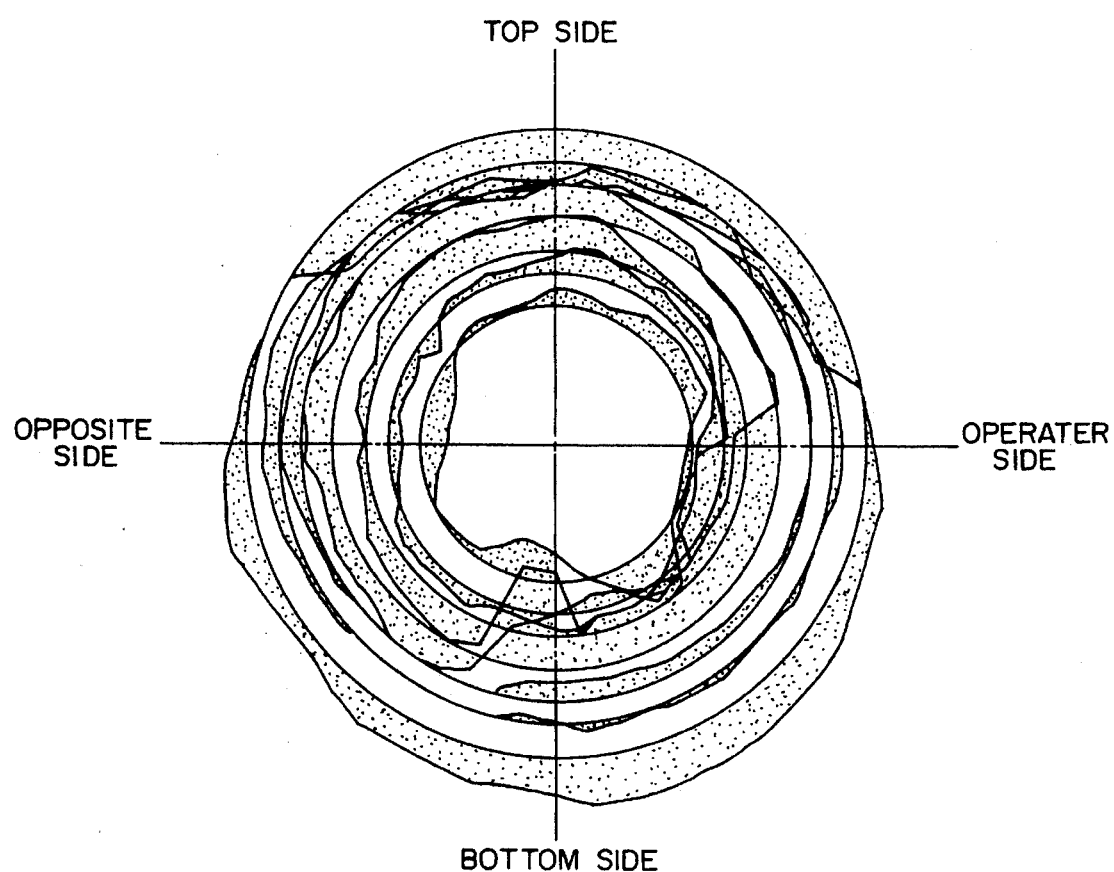
FIG. 6 is a circular graph showing unevenness of birefringence in a compact disc molded by the conventional injection mold.

Using an injection mold having the same configuration as that in the example as described above, an injection molding was carried out to obtain a compact disc having the same diameter of 120 mm as that shown in FIG. 6 under the conditions of mold temperature of 80° C., resin temperature of 320° C. and a cooling time of 2.5 seconds. In each of the circumferential directions of seven radial directions of the obtained disc, birefringence was measured at fifty points in the same manner as that in the conventional example. The average values per each of the radiuses were found from the measured values, and the average values were subtracted from each of the measured values. FIG. 3 is a circle graph showing the remainders obtained by subtracting the average values from each of the measured values. In this figure, the speckled portions show unevenness of the birefringence. The larger area of the speckled portion means the large unevenness of the birefringence. As compared to the conventional example shown in FIG. 6, it is apparent that there is small unevenness of the birefringence in the face of the compact disc according to an injection mold of the present invention, thereby obtaining a compact disc having almost uniform optical properties.

In the embodiment as described above, the injection mold of the present invention is applied to a mold for molding a compact disc (a substrate for an optical disc). However, the injection mold of the present invention is not limited to this. The same effect as that in the embodiment may be obtained when the injection mold of the present invention is applied to another molds for molding various products having relatively large areas and shapes of flat plate, and requiring dimensional accuracy such as degree of flatness and uniformity of optical properties such as birefringence.

In one form of the invention, there is provided an injection mold having a cavity formed between opposing faces of a fixed mold and a movable mold for defining a shape of a product wherein cooling channels of the movable mold are formed in the movable mold at positions at least opposite to those where cooling channels of the fixed mold are not formed.

In an another form of the invention, there is provided an injection mold wherein a circular-shaped cavity is formed and the cooling channels of the fixed mold and the movable mold are formed of a plurality of cooling channels extending to circumferential directions, respectively, and the cooling channels extending to circumferential directions of the movable mold are arranged at positions at least opposite to those between cooling channels extending circumferential directions of the fixed mold in the radial direction of the cavity.

These features of the invention offer the following advantages:

Almost all parts of the cavity may be uniformly cooled by covering the sites in one of the fixed mold and the movable mold where cooling channels are not formed with the cooling channels formed in the other mold.

Even when the cooling time is shortened in order to increase a cycle of the injection molding, uniformity of the optical properties of the obtained molded article, such as birefringence may be secured, and the molded article does not cause deterioration of mechanical properties, such as a deflection. Therefore, an injection mold according to the present invention offers excellent advantages when used for molding a flat plate-shaped substrate for an optical disc having a large project area.

What is claimed is:

1. An injection mold having a cavity formed between opposing faces of a fixed mold and a movable mold for defining a shape of a product, and cooling channels formed in said fixed mold and said movable mold, respectively, for cooling resins injected into said cavity, wherein cooling channels of said movable mold are formed in said movable mold at positions at least opposite to those where cooling channels of said fixed mold are not formed.

2. An injection mold having a circular-shaped cavity formed between opposing faces of a fixed mold and a movable mold for defining a shape of a product, and cooling channels formed in said fixed mold and said movable mold, respectively, for cooling resins injected into said cavity, wherein said cooling channels of said fixed mold and said movable mold are formed of a plurality of cooling channels extending to circumferential directions, respectively, and said cooling channels extending to circumferential directions of said movable mold are arranged at positions at least opposite to those where cooling channels of said fixed mold are not formed.

3. An injection mold according to claim 1 or 2, wherein an internal profile of said cavity is shaped as a substrate for an optical disc.

* * * * *